(12) United States Patent
Dispensa et al.

(10) Patent No.: US 7,454,394 B2
(45) Date of Patent: Nov. 18, 2008

(54) CACHING FOR END-USER SYSTEMS TO REDUCE USAGE OF ACCESS LINKS TO A COMMUNICATION NETWORK

(75) Inventors: Steve Dispensa, Shawnee Mission, KS (US); Steve Myers, Lee's Summit, MO (US); Jason M. Sloderbeck, Kansas City, MO (US); John Spaeth, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/312,189

(22) Filed: Dec. 20, 2005

(65) Prior Publication Data

US 2006/0136563 A1    Jun. 22, 2006

Related U.S. Application Data

(63) Continuation of application No. 10/128,036, filed on Apr. 23, 2002, now Pat. No. 7,016,883.

(51) Int. Cl.
*G06F 17/00* (2006.01)
*G06N 5/02* (2006.01)

(52) U.S. Cl. .............................. 706/46; 706/12; 706/14

(58) Field of Classification Search .................. 706/46, 706/12, 14; 707/1; 709/223
See application file for complete search history.

(56) References Cited

U.S. PATENT DOCUMENTS

| | | | | |
|---|---|---|---|---|
| 2002/0082997 | A1* | 6/2002 | Kobata et al. ................. | 705/51 |
| 2002/0120607 | A1* | 8/2002 | Price et al. ..................... | 707/1 |
| 2002/0129264 | A1* | 9/2002 | Rowland et al. ............ | 713/200 |
| 2002/0143918 | A1* | 10/2002 | Soles et al. .................. | 709/223 |
| 2002/0162109 | A1* | 10/2002 | Shteyn ......................... | 725/87 |
| 2003/0055732 | A1* | 3/2003 | Nagata ......................... | 705/22 |
| 2003/0097571 | A1* | 5/2003 | Hamilton et al. ............ | 713/182 |
| 2003/0158958 | A1* | 8/2003 | Chiu ............................ | 709/231 |
| 2003/0177246 | A1* | 9/2003 | Goodman et al. ........... | 709/228 |
| 2004/0070678 | A1* | 4/2004 | Toyama et al. ........... | 348/231.3 |
| 2004/0236698 | A1* | 11/2004 | Sweeney ..................... | 705/64 |
| 2005/0075949 | A1* | 4/2005 | Uhrig et al. .................. | 705/28 |

OTHER PUBLICATIONS

Matei Ripeanu, Peer-to-Peer Architecture Case study: Gnutella Network, Aug. 2001, IEEE, 0-7695-1503-7/02, 99-100.*

(Continued)

*Primary Examiner*—Joseph P Hirl

(57) ABSTRACT

An access system that is coupled to a communication network hosts a file for an end-user system. The access system receives the file from the end-user system. The access system stores the file in a memory in the access system. The access system receives a message from the communication network, wherein the message requests the file from the end-user system. In response to the message, the access system determines if the file may be transferred to the communication network from the memory in the access system. If the file may be transferred to the communication network from the memory in the access system, then the access system notifies the end-user system that the file will be transferred from the memory in the access system to the communication network and transfers the file from the access system to the communication network.

26 Claims, 5 Drawing Sheets

OTHER PUBLICATIONS

Matei Ripeanu et al., Mapping the Gnutella Network, Jan.Feb. 2002, IEEE, 1089-7801/02, 50-57.*

Steven M. Cherry, Making Music Pay, Oct. 2001, IEEE, Spectrum, 41-46.*

Richard Gold, Toward a Content-based Aggregation Network, 2002, IEEE, 62-68.*

Manoj Parameswaran, P2P Networking: An Information-Sharing Alternative, 2001, IEEE, Computing Practices, 31-38.*

Sanjay Lal, Distributed Resource allocation for DS-CDMA-Based Multimedia ad hoc Wireless LAN's, IEEE, Journal of Selected Areas in Communications, 947-967, Date of Document: May 1999.*

* cited by examiner

CACHING FOR END-USER SYSTEMS TO REDUCE USAGE OF ACCESS LINKS TO A COMMUNICATION NETWORK

RELATED APPLICATIONS

This patent application is a continuation of U.S. patent application Ser. No. 10/128,036 filed on Apr. 23, 2002 now U.S. Pat. No. 7,016,883, and titled "REVERSE CACHING FOR RESIDENTIAL END-USERS TO REDUCE USAGE OF ACCESS LINKS TO A CORE COMMUNICATION NETWORK," and which is hereby incorporated by reference into this patent application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to technology for reducing the usage of access links to a core network.

2. Description of the Prior Art

Most communication networks that serve residential end-users can be viewed as a core communication network that is connected to the residential end-users over access links. In one example of such network, the core communication network is the Internet and the access links are wireless links to an Internet portal. To access the Internet, the residential end-users operate wireless transceivers to communicate over wireless access links.

These access links often form a bandwidth bottleneck on communications between the residential end-users. Thus, the bandwidth on the access connections is typically much lower than that available in the core communication network. If the access links operate as a shared medium among multiple residential end-users, then the bandwidth bottleneck can be especially severe during periods of heavy usage. The unfortunate result is diminished communication services to all residential end-users who share the access links.

File sharing protocols are becoming popular among residential end-users. Some examples of these end-user file sharing protocols are Napster and Gnutella. These file sharing protocols allow residential end-users to become content hosts that serve up content files, such as songs and movies, over the Internet. The file sharing protocols allow others around the world to locate and download a desired song or movie from a specific residential end-user.

Unfortunately, the residential end-users transfer their content files over their access links to the core communication network. Typically, the transfer of content files requires significant bandwidth. The transfer of content files over the access links degrades communication services to all who share the access links. When a residential end-user hosts a popular content file, communication services can be seriously degraded.

SUMMARY OF THE INVENTION

Examples of the invention include an access system and its method of operation. The access system hosts a file for an end-user system, wherein the end-user system is coupled to the access system over an access link and wherein the access system is coupled to a communication network. The access system receives the file from the end-user system over the access link. The access system stores the file in a memory in the access system. The access system receives a message from the communication network, wherein the message requests the file from the end-user system. In response to the message, the access system determines if the file may be transferred to the communication network from the memory in the access system. If the file may be transferred to the communication network from the memory in the access system, then the access system notifies the end-user system that the file will be transferred from the memory in the access system to the communication network and transfers the file from the access system to the communication network.

In some examples of the invention, determining if the file may be transferred to the communication network from the memory in the access system comprises determining if the end-user system is using the file.

In some examples of the invention, determining if the file may be transferred to the communication network from the memory in the access system comprises preventing concurrent use of the file.

In some examples of the invention, notifying the end-user system that the file will be transferred from the memory in the access system to the communication network comprises inhibiting the end-user system from using the file.

In some examples of the invention, notifying the end-user system that the transfer of the file from the memory in the access system to the communication network is complete.

In some examples of the invention, storing the file in the memory in the access system comprises, before storing the file, determining if the file should be stored in the memory in the access system.

In some examples of the invention, determining if the file should be stored in the memory in the access system comprises determining if the end-user system has a legal right to store the file in the memory in the access system.

In some examples of the invention, determining if the file should be stored in the memory in the access system comprises determining if the file is already stored in the memory in the access system.

In some examples of the invention, the access link comprises a wireless link.

In some examples of the invention, the access link comprises a Code Division Multiple Access (CDMA) link.

In some examples of the invention, the access link comprises a Multipount.

In some examples of the invention, the file comprises an audio file.

In some examples of the invention, the file comprises a video file.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
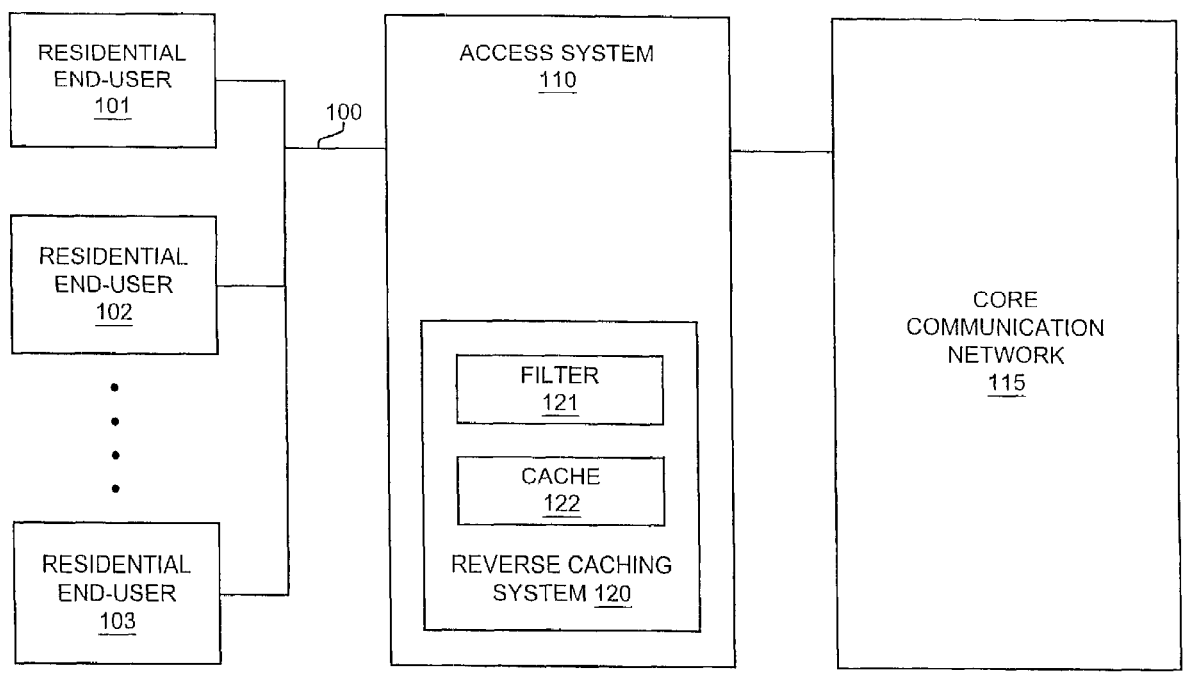
FIG. 1 illustrates a reverse caching environment in an example of the invention.
Figure 2:
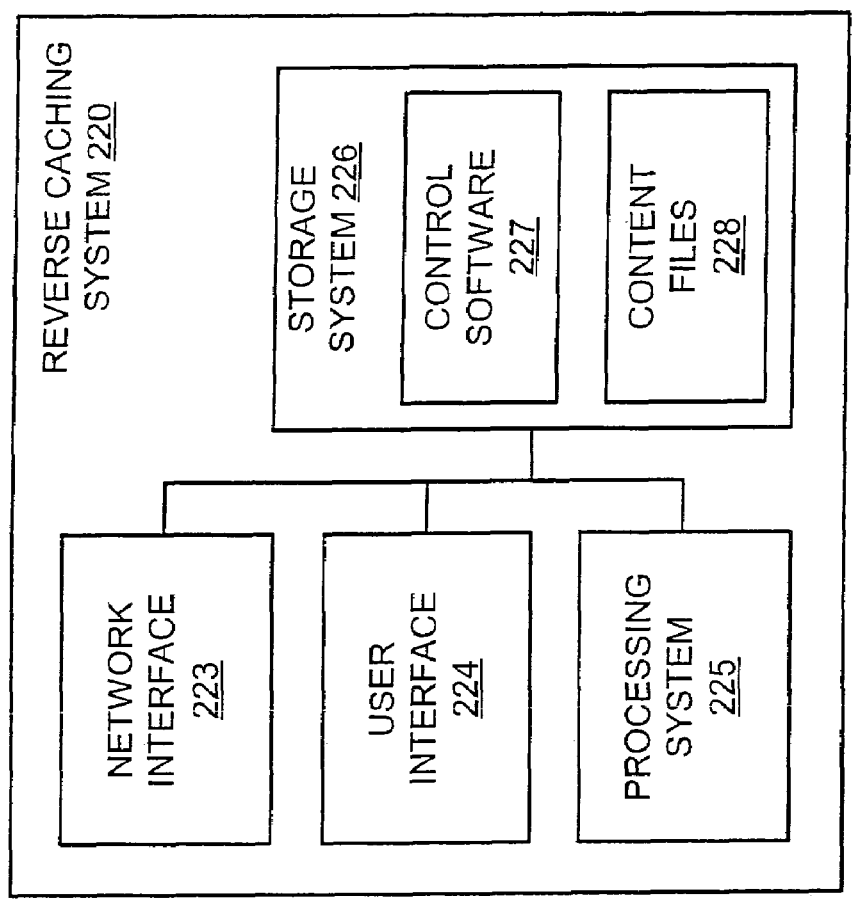
FIG. 2 illustrates a reverse caching system in an example of the invention.

Reverse Caching System Configuration—FIGS. 1-2

FIG. 1 illustrates a reverse caching environment in an example of the invention. Residential end-users 101-103 are coupled to access links 100. Access links 100 are coupled to access system 110. Access system 110 is coupled to core communication network 115. Access system 110 includes reverse caching system 120.

Core communication network 115 could be the Internet or some other data communication system available to residential end-users. Access system 110 could be an Internet service provider or some other portal to core communication network 115. Access links 100 could use metallic, optical fiber, wireless link (air), or some other media. Examples of metallic media include coaxial cable and twisted pair wires. Access links 100 could use multipoint multiservice distribution system, code division multiple access, analog telephony, digital subscriber line, Internet protocol, Ethernet, asynchronous transfer mode, or some other type of communication protocol.

Residential end-users 101-103 are individual persons living in a residence, such as a home or apartment. Residential end-users 101-103 operate end-user systems that are coupled to access links 100. The end-user systems could be computers, televisions, telephones, digital assistants, Internet appliances, or some other type of communication device. Residential end-users 101-103 host content files, such as audio and video files. Residential end-users 101-103 use an end-user file sharing protocol, such as Napster or Gnutella, to transfer their content files over access links 100 to core communication network 115.

Reverse caching system 120 includes filter 121 and cache 122. Cache 122 is configured to store the content files. Filter 121 monitors residential end-user communications to cache content files that are transferred from residential end-users 101-103 over access links 100 to core network 115. Filter 121 also monitors the residential end-user communications to identify requests for the content files that are in cache 122. In response to identifying the requests, filter 121 transfers the requested content files from cache 122 to core communication network 115. Advantageously, the usage of access links 100 is reduced because they do not repeatedly transfer the same content files. This usage reduction maintains higher quality communication services for residential end-users 101-103.

FIG. 2 illustrates reverse caching system 220 in an example of the invention. Reverse caching system 220 includes network interface 223, user interface 224, processing system 225, and storage system 226. Storage system 226 stores control software 227 and content files 228. Processing system 102 is linked to network interface 223, user interface 224, and storage system 226. Reverse caching system 220 could be comprised of a programmed general purpose computer, although those skilled in the art will appreciate that programmable or special purpose circuitry and equipment may be used. Reverse caching system 220 may use a client server architecture where operations are distributed among a server system and client devices that together comprises elements 223-228.

Network interface 223 could comprise a network interface card or some other communication device. Network interface may include a packet filtering application specific integrated circuit configured to detect packets that use specific end-user file sharing protocols. For example, a digital filter could be configured to detect Napster or Gnutella packets. Network interface 223 may be distributed among multiple communication devices.

User interface 224 could comprise a keyboard, mouse, voice recognition interface, graphical display, touch screen, or some other type of user device. Processing system 225 could comprise a computer microprocessor, logic circuit, or some other processing device. Processing system 225 may be distributed among multiple processing devices. Storage system 226 could comprise a disk, tape, integrated circuit, server, or some other memory device. Storage system 226 may be distributed among multiple memory devices.

Processing system 225 retrieves and executes control software 227 from storage system 226. Control software 227 could comprise an application program, firmware, or some other form of machine-readable processing instructions. When executed by processing system 225, control software 227 directs processing system 225 to operate in accord with the invention.

Network interface 223, processing system 225, storage system 226, and control software 227 could comprise filter 121 of FIG. 1. Storage system 226 and content files 228 could comprise cache 122 of FIG. 1. User interface 224 could be used for configuration and data output for either filter 121 or cache 122.

Figure 3:
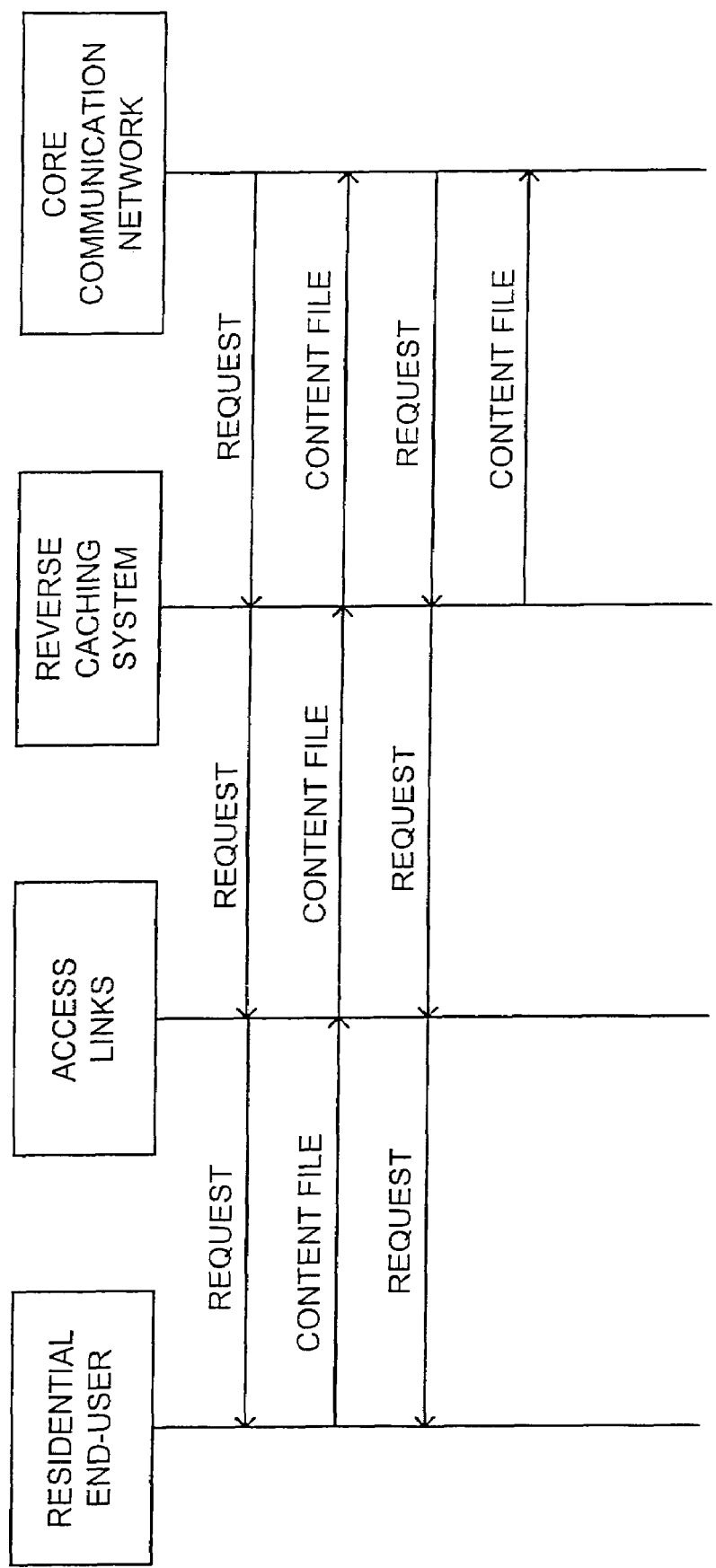
FIG. 3 illustrates a reverse caching communication sequence in an example of the invention.
Figure 4:
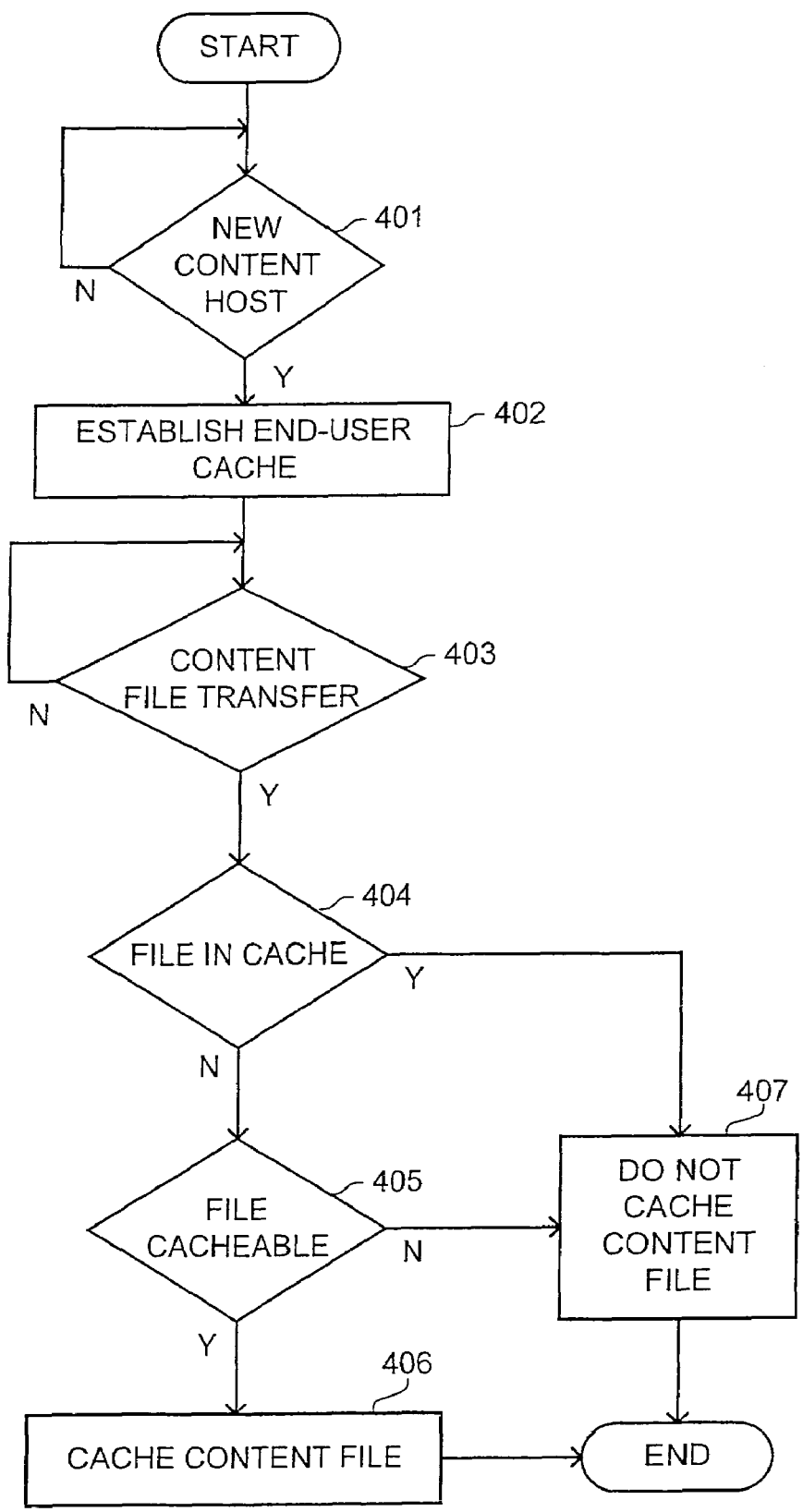
FIG. 4 illustrates reverse caching system operation in an example of the invention.
Figure 5:
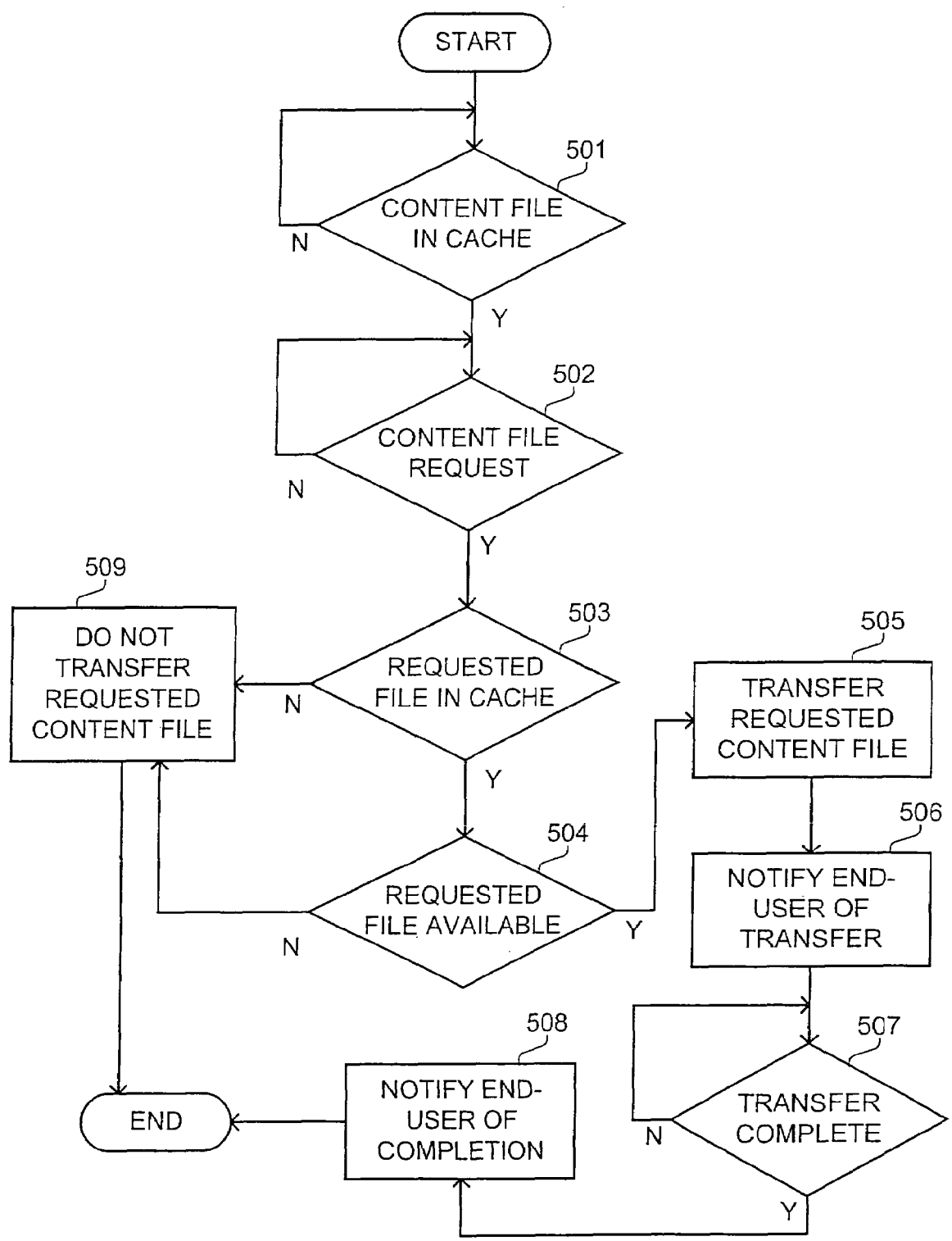
FIG. 5 illustrates reverse caching system operation in an example of the invention.

Reverse Caching System Operation—FIGS. 3-5 FIG. 3 illustrates a reverse caching communication sequence in an example of the invention. Initially, another end-user sends a request for a content file to the residential end-user through the core communication network, reverse caching system, and access links. In response to the request, the residential end-user transfers the requested content file to the other end-user through the access links, reverse caching system, and core communication network. The reverse caching system caches the content file during this file transfer.

Subsequently, the other end-user sends another request for the content file to the residential end-user through the core communication network, reverse caching system, and access links. In response to the request, the reverse caching system transfers the requested content file to the other end-user through the core communication network. Note that access links are not required to subsequently transfer the content file—resulting in significant bandwidth savings on the access links.

FIG. 4 illustrates reverse caching system operation in an example of the invention, and operational steps are indicated parenthetically. The reverse caching system monitors residential end-user communications to identify residential end-users that become content file hosts (401). For example, filter circuitry in the reverse caching system may detect the use of an end-user file sharing protocol or a communication with a file sharing registration server. If a new content file host is identified among the residential end-users, then the reverse caching system establishes a cache for that particular residential end-user (402).

The reverse caching system then monitors the residential end-user communications to identify content file transfers from the residential end-user (403). For example, filter circuitry in the reverse caching system may detect the use of an end-user file sharing protocol. The reverse caching system determines if the transferred content file is already in the end-user cache (404). If not, then a database check is made to determine if the particular content file is cacheable (405). For example, the database may indicate if the residential end-user has the appropriate legal rights for reverse caching the transferred content file. If the transferred content file is cacheable, but is not in the cache, then the reverse caching system caches the content file in the residential end-user cache (406). If the transferred content file is not cacheable, or is already in the cache, then the reverse caching system does not cache the content file (407).

FIG. 5 illustrates reverse caching system operation in an example of the invention. After the residential end-user has a content file in the end-user cache (501), the reverse caching system monitors the residential end-user communications to identify requests for content file transfers directed to the residential end-user (502). For example, filter circuitry in the reverse caching system may detect the use of an end-user file sharing protocol. The reverse caching system then determines if the requested content file is in the end-user cache (503). If so, the reverse caching system determines if the content file is available for transfer (504). For example, concurrent use by the requesting end-user and the residential end-user may not be allowed, so a check would be made to determine if the residential end-user was currently using the content file.

If the requested content file is in the end-user cache and available for transfer, then the reverse caching system transfers the requested content file from the end-user cache to the core communication network (505). The reverse caching system also notifies the residential end-user of the transfer (506). The notification inhibits any content file transfer from the residential end-user over the access links. The notification also prevents improper concurrent use of the content file. After the transfer from cache is complete (507), the reverse caching system notifies the residential end-user, so they can again properly use the content file (508). If the requested content file is not in the end-user cache, or if the content file is not available for transfer, then the reverse caching system does not transfer the requested content file (509).

The reverse caching system may establish a cache for each individual residential end-user and treat each cache separately. This might entail maintaining a data structure that associates individual residential end-users with individual cached content files. Alternatively, the reverse caching system may pool all content files in a common cache to reduce duplicate content file storage. The reverse caching system may also group all residential end-users sharing the same access links as one virtual end-user to further simplify the system.

What is claimed is:

1. A method of operating an access system to host a file for an end-user system, wherein the end-user system is coupled to the access system over an access link and wherein the access system is coupled to a communication network, the method comprising:
   receiving the file from the end-user system over the access link;
   in response to receiving the file, determining whether the end-user system uses an end-user file-sharing protocol;
   when the end-user system uses an end-user file-sharing protocol, establishing a cache for the end-user system and storing the file in the cache in the access system;
   receiving a message into the access system from the communication network, wherein the message requests the file from the end-user system;
   in response to the message, determining if the file is allowed to be transferred to the communication network from the cache in the access system; and
   if the file is allowed to be transferred to the communication network from the cache in the access system, then notifying the end-user system that the file will be transferred from the cache in the access system to the communication network and transferring the file from the access system to the communication network.

2. The method of claim 1 wherein determining if the file is allowed to be transferred to the communication network from the cache in the access system comprises determining if the end-user system is using the file.

3. The method of claim 1 wherein determining if the file is allowed to be transferred to the communication network from the cache in the access system comprises preventing concurrent use of the file.

4. The method of claim 1 wherein notifying the end-user system that the file will be transfeffed from the cache in the access system to the communication network comprises inhibiting the end-user system from using the file.

5. The method of claim 1 further comprising notifying the end-user system that the transfer of the file from the cache in the access system to the communication network is complete.

6. The method of claim 1 wherein storing the file in the cache in the access system comprises, before storing the file, determining if the file should be stored in the cache in the access system.

7. The method of claim 6 wherein determining if the file should be stored in the cache in the access system comprises determining if the end-user system has a legal right to store the file in the cache in the access system.

8. The method of claim 6 wherein determining if the file should be stored in the cache in the access system comprises determining if the file is already stored in the cache in the access system.

9. The method of claim 1 wherein the access link comprises a wireless link.

10. The method of claim 1 wherein the end-user system comprises a wireless telephone.

11. The method of claim 1 wherein the end-user system comprises a television.

12. The method of claim 1 wherein the file comprises an audio file.

13. The method of claim 1 wherein the file comprises a video file.

14. An access system to host a file for an end-user system, wherein the end-user system is coupled to the access system over an access link and wherein the access system is coupled to a communication network, the access system comprising:

a caching system to receive the file from the end-user system over the access link and in response to receiving the file, determine whether the end-user system uses an end-user file-sharing protocol;

when the end-user system uses an end-user file-sharing protocol, the caching system to establish a cache for the end-user system to store the file in the access system;

the caching system further to receive a message from the communication network, wherein the message requests the file from the end-user system, and in response to the message, to determine if the file is allowed to be transferred to the communication network from the cache, and if the file is allowed to be transferred to the communication network from the cache, then to notify the end-user system that the file will be transferred from the cache in the access system to the communication network and to transfer the file from the access system to the communication network.

15. The access system of claim 14 wherein the caching system determines if the file is allowed to be transfeffed to the communication network from the cache based on whether the end-user system is using the file.

16. The access system of claim 14 wherein the caching system determines if the file is allowed to be transfeffed to the communication network from the cache based on preventing concurrent use of the file.

17. The access system of claim 14 wherein the caching system notifies the end-user system that the file will be transferred from the cache to the communication network to inhibit the end-user system from using the file.

18. The access system of claim 14 wherein the caching system notifies the end-user system that the transfer of the file from the cache to the communication network is complete.

19. The access system of claim 14 wherein the caching system determines if the file should be stored in the cache before the cache stores the file.

20. The access system of claim 19 wherein the caching system determines if the file should be stored in the cache based on whether the end-user system has a legal right to store the file in the cache in the access system.

21. The access system of claim 19 wherein the caching system determines if the file should be stored in the cache based on whether the file is already stored in the cache.

22. The access system of claim 14 wherein the access link comprises a wireless link.

23. The access system of claim 14 wherein the end-user system comprises a wireless telephone.

24. The access system of claim 14 wherein the end-user system comprises a television.

25. The access system of claim 14 wherein the file comprises an audio file.

26. The access system of claim 14 wherein the file comprises a video file.

* * * * *